(12) United States Patent
Lokhandwala et al.

(10) Patent No.: US 7,537,641 B2
(45) Date of Patent: May 26, 2009

(54) NATURAL GAS TREATMENT PROCESS FOR STIMULATED WELL

(75) Inventors: Kaaeid A. Lokhandwala, Fremont, CA (US); Ankur Jariwala, Mountain View, CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 466 days.

(21) Appl. No.: 11/293,356

(22) Filed: Dec. 2, 2005

(65) Prior Publication Data

US 2007/0125537 A1 Jun. 7, 2007

(51) Int. Cl.
*B01D 53/22* (2006.01)
*E21B 33/16* (2006.01)

(52) U.S. Cl. .......................... 95/45; 95/1; 95/8; 95/12; 95/22; 95/23; 95/47; 95/50; 95/51; 96/4; 96/7; 96/9; 96/417; 96/422; 166/267

(58) Field of Classification Search .................. 95/1, 95/8, 12, 19, 22, 23, 45, 47, 50, 51; 96/4, 96/7, 9, 417, 421, 422; 166/267, 291, 300, 166/304, 308.4, 312; 507/261, 265, 928, 507/929; 422/168, 169
See application file for complete search history.

(56) References Cited

U.S. PATENT DOCUMENTS

| | | | | | |
|---|---|---|---|---|---|
| 4,397,661 | A | * | 8/1983 | King et al. | 96/8 |
| 4,553,983 | A | * | 11/1985 | Baker | 95/50 |
| 4,627,495 | A | * | 12/1986 | Harris et al. | 166/280.1 |
| 4,857,082 | A | * | 8/1989 | DiMartino et al. | 95/19 |
| 5,053,058 | A | * | 10/1991 | Mitariten | 95/8 |
| 5,964,923 | A | * | 10/1999 | Lokhandwala | 95/50 |
| 6,197,090 | B1 | * | 3/2001 | Yamashita et al. | 95/12 |
| 6,579,341 | B2 | * | 6/2003 | Baker et al. | 95/47 |
| 6,955,704 | B1 | * | 10/2005 | Strahan | 95/8 |

* cited by examiner

*Primary Examiner*—Jason M Greene
(74) *Attorney, Agent, or Firm*—J. Farrant (57) ABSTRACT

A process and equipment for treating natural gas produced by a well that has recently been stimulated, and that contains an undesirably high concentration of the fracturing gas used to stimulate the well. The process involves treating the gas by membrane separation, and provides for control of treatment parameters to compensate for the changing concentration of fracturing gas in the produced gas, as well as changes in gas flow rate.

34 Claims, 5 Drawing Sheets

FIG. 5

NATURAL GAS TREATMENT PROCESS FOR STIMULATED WELL

FIELD OF THE INVENTION

The invention relates to processes and equipment for removing a fracturing gas, such as nitrogen, from natural gas.

BACKGROUND OF THE INVENTION

Hydraulic fracturing is used to create cracks in oil- or gas-bearing formations to facilitate movement of oil or gas to a well bore and stimulate production from that well.

Fracturing is performed by pumping a fluid at high pressure down the well and into the formation. The fluid may be water, carbon dioxide or nitrogen, for example. The fluid usually contains sand or other "proppant" to hold the fracture open after the fracturing fluid has dissipated or been pumped out, as well as viscosity modifiers and other optional components.

Immediately after a gas well has been stimulated, for example using nitrogen as the fracturing fluid, the nitrogen content of the gas emerging from the well is extremely high. After a short time, typically no more than a week or ten days, the gas returns to its pre-stimulation composition. The same situation occurs with any other fracturing gas, such as carbon dioxide.

Until the fracturing gas content drops, the gas is usually unsuitable to be sent to its original destination, typically a gas pipeline or gas processing facility. Absent any technically or economically feasible treatment technology, the stimulant-rich gas is simply vented or flared, options that waste otherwise valuable natural gas that is coproduced during this period and are environmentally harmful.

Technologies for removing nitrogen from natural gas are known, specifically cryogenic distillation and membrane separation. Unless the well happens to be adjacent to a gas processing plant with cryogenic distillation capabilities, it is clearly not practical to apply cryogenic technology for such a short-term use. In addition, the rapidly changing nitrogen content of the gas would make the use of cryogenics very difficult.

Membrane-based gas separation systems are robust, modular, skid-mounted units that are much more amenable to being incorporated into a movable system than large cryogenic distillation columns. U.S. Pat. No. 6,955,704, to Strahan, describes the use of a mobile unit to treat gas immediately after a well has been stimulated using carbon dioxide. The unit includes a pretreatment system to remove solids, hydrocarbons and water, and a membrane unit to separate carbon dioxide from the raw gas.

Even a membrane system will have difficulties treating post-stimulation gas, however, because the performance of the membrane unit varies with the feed gas composition, feed flow rate and gas pressure. For this reason, membrane systems are not used to treat unstable gas streams characterized by substantially changing parameters. In the case of a gas stream produced by a well after stimulation, the difficulty is exacerbated because the concentration of fracturing gas changes by the hour, especially in the first days after stimulation. The flow rate of the gas also varies rapidly, peaking within a few hours and subsequently decreasing progressively.

As the content of fracturing gas in the produced gas drops, the compositions of the residue and permeate streams from a membrane unit will change substantially. A system designed to treat the initial gas composition will significantly overprocess the gas as time goes on, wasting energy to do so. The product streams may also fail to meet the target specifications for their pre-stimulation destinations.

Likewise, a system designed for a certain flow rate or feed pressure will not be able to maintain consistent performance if the flow or pressure of the feed gas increases or decreases.

In light of these problems, the need for treatment that is both mobile and able to process gas of changing composition or flow rate remains.

SUMMARY OF THE INVENTION

The invention is a process for treating natural gas produced by a recently stimulated well to reduce the concentration of fracturing gas in the natural gas to a desired level.

The process may be applied to any post-stimulation natural gas stream, provided that membranes with selectivity between methane and the stimulant or fracturing gas are available.

The process may be applied to gas containing any amount of fracturing gas, from more than 50 vol %, such as 60 vol %, 70 vol % or more, to just a few percent, such as less than 10 vol %. Most commonly, the process is useful in treating natural gas containing 10-50 vol % fracturing gas.

Subject to the availability of membranes, any fracturing gas may be removed by the process of the invention. Most commonly, the fracturing gas is nitrogen or carbon dioxide.

The membrane may show selectivity in favor of the fracturing gas over methane, or methane over the fracturing gas. If nitrogen is the fracturing gas, membranes that provide selectivity in favor of nitrogen over methane are available, as are membranes that provide selectivity in favor of methane over nitrogen. In general, membranes that provide selectivity in favor of methane are preferred. If carbon dioxide is the fracturing gas, the membranes will normally be selective in favor of carbon dioxide over methane.

In a basic embodiment, the process of the invention includes:

(a) providing a membrane unit comprising:
  (i) a membrane having a feed side and a permeate side;
  (ii) automatic monitoring means positioned in a gas flow line to the membrane unit to monitor at least a concentration of the fracturing gas in the natural gas, a flow rate of the natural gas or a pressure of the natural gas;
  (iii) automatic control means connected in signal-transferring relationship to the automatic monitoring means and adapted to adjust at least one operating parameter of the membrane unit;
(b) passing the natural gas stream through the gas flow line and across the feed side as a feed stream;
(c) providing a driving force for transmembrane permeation;
(d) withdrawing from the membrane unit a first treated gas stream enriched in the fracturing gas compared with the feed stream;
(e) withdrawing from the membrane unit a second treated gas stream depleted in the fracturing gas compared with the feed stream;
(f) adjusting the operating parameter in response to a change in at least one of the concentration, the flow rate and the pressure.

A driving force for transmembrane permeation is usually provided by a pressure difference between the feed and permeate sides of the membrane. Optionally, the gas may be compressed to provide or augment the driving force before passing the gas into the membrane modules.

The membrane unit may be configured in any way that enables the gas under treatment to be processed to yield a fracturing-gas depleted stream that meets prescribed targets for composition, methane recovery or both.

The membrane unit may be a single-stage unit, consisting of one or more membrane modules or banks of modules. The feed gas stream passes across each membrane module in series, or is split so that a portion of the feed is directed to each membrane module in parallel, and a single residue stream and a single permeate stream are collected. Such a system may be controlled by bringing more of the modules on line, or taking more of the modules off line, as the fracturing gas content of the feed gas changes.

More preferably, the unit is configured as a two-stage unit, that is, a unit in which the permeate from the first stage or bank of modules is recompressed and passed as feed to a second bank or stage of modules. A system of this type may be controlled by varying the on-line membrane area, as described above. Alternatively, or additionally, one or more valves may be used to control pressures, flow volumes and compositions within the system.

These valves may be positioned at the inlet to the membrane system, on the feed side of individual banks of membrane modules, in recycle lines or in a discharge line, for example. The valves open and close in response to changes in the fracturing gas content of the raw feed gas, the feed gas flow rate or pressure or any other operating parameter, as explained in more detail below.

Most preferably, the unit is configured as a two-stage unit, with each stage split into two steps. By splitting each stage into two steps, so that there are four banks of membrane modules in the system, a high degree of control over natural gas product recovery, gas composition and operating costs can be obtained. Such control is highly desirable to account for the expected rapidly changing conditions in the feed gas.

The membrane unit includes monitoring means to periodically measure or continuously monitor at least one property, such as concentration of fracturing gas, flow rate or pressure of the feed gas entering the unit. Preferably, the monitoring means includes an in-line gas chromatograph (GC) to measure gas composition and an in-line flow meter to measure flow.

The monitoring means may be operated manually, but most preferably is automatic and can be programmed to take readings as frequently as desired, or to monitor a property essentially continuously.

The membrane unit also includes control means to adjust at least one operating parameter of the unit in response to a measurement taken by the monitoring means. The control means may be no more complicated than a set of valves that can be opened or closed manually.

More preferably, the control means takes the form of an automated process control system using programmable logic that can capture information from the monitoring system and use this information to vary the setting of one or more automatic valves, as explained in more detail below.

Two treated gas streams are discharged from the process, one depleted and one enriched in the fracturing gas compared with the feed gas. Optionally the composition, pressure or flow rate of one or both of these streams may be measured and the measurement used for additional control of the operation of the membrane unit, either manually or by means of the automated process control system.

The treated natural gas stream that is depleted in the fracturing gas is the principal product stream of the process, and may be sent to any appropriate destination. Typically, the membrane unit is operated to reduce the fracturing gas concentration in this stream to a target value, such as about 5 vol %, 10 vol % or 15 vol %, for example. The target value usually depends on the destination of the treated natural gas. If the gas is be sent directly to a pipeline, the target value should meet pipeline specification and is likely to be low, such as less than 4 vol % or even 2 vol % fracturing gas. If the gas is to be pooled with gas from other wells or sent to a gas processing facility, the acceptable fracturing gas content may be much higher, such as 10 vol %, 15 vol % or even more.

The treated gas stream that is enriched in fracturing gas contains a high concentration of the fracturing gas; the fracturing gas is usually the major component. This stream may also be sent to any appropriate destination. Representative non-limiting options for this gas stream, depending on specific circumstances, include venting the gas (if it is mostly nitrogen, for example) flaring it, using it locally as engine or boiler fuel (if it contains enough methane), or subjecting it to further separation to recover the fracturing gas for further use.

In a most preferred embodiment, the process of the invention includes:

(a) measuring the changing concentration at least periodically;

(b) compressing the natural gas stream;

(c) passing the compressed natural gas stream to a feed inlet of a membrane unit comprising a first membrane bank, a second membrane bank, a third membrane bank and a fourth membrane bank, the membrane banks being connected to allow gas flow at least from the first bank to the second and third banks, and from the third bank to the fourth bank;

(d) processing the natural gas stream in the first membrane bank to produce a first permeate stream at lower pressure than the compressed natural gas stream and a first residue stream;

(e) passing the first residue stream to the second membrane bank and there processing the first residue stream to produce a second permeate stream at lower pressure than the compressed natural gas stream and a second residue stream;

(f) discharging the second residue stream from the process;

(g) recompressing the first permeate stream;

(h) passing the recompressed first permeate stream to the third membrane bank and there processing the first permeate stream to produce a third permeate stream at lower pressure than the compressed natural gas stream and a third residue stream;

(i) discharging the third permeate stream from the process as a treated natural gas stream having a reduced concentration of fracturing gas;

(j) passing the third residue stream to the fourth membrane bank and there processing the third residue stream to produce a fourth permeate stream at lower pressure than the compressed natural gas stream and a fourth residue stream;

(k) recirculating the second permeate stream through a first control valve to step (b);

(l) recirculating the fourth residue stream to step (c);

(m) recirculating the fourth permeate stream through a second control valve to step (g);

(n) measuring the reduced fracturing gas concentration at least periodically;

(o) as the changing concentration changes, periodically adjusting a first setting of the first control valve to change the volume of gas flowing through the first control valve in response to a change in the changing concentration;

(p) if the reduced fracturing gas concentration deviates from a target value, periodically adjusting a second setting of the second control valve to change the volume of gas flowing through the second control valve.

In another aspect, the invention is the equipment used to carry out the above-described processes.

DETAILED DESCRIPTION OF THE INVENTION

The term fluid as used herein refers to a gas, liquid or mixture of gas and liquid.

The terms fracturing gas and stimulant gas are used synonymously herein.

The term two-step as used herein mean an arrangement of membrane modules or banks of membrane modules connected together such that the residue stream from one module or bank of modules becomes the feedstream for the next.

The term two-stage as used herein mean an arrangement of membrane modules or banks of membrane modules connected together such that the permeate stream from one module or bank of modules becomes the feedstream for the next.

The term membrane array is a general term meaning a set of membrane modules or banks of modules connected in any arrangement Percentages herein are by volume unless otherwise stated.

The invention is a process for treating natural gas produced by a recently stimulated well to reduce the concentration of fracturing gas in the natural gas. The process typically produces two discharge streams, one a treated natural gas stream enriched in methane and depleted in fracturing gas compared with the feed stream, the other a gas stream rich in the fracturing gas. These streams may be sent to any destination, including, but not limited to, a gas-gathering station, a pipeline, a processing facility, a fuel line, a tanker, a reinjection line, a flare or a vent line.

Most commonly, the primary goal of the process is to enable the treated natural gas stream to be pooled with gas from other wells in the gas field, so as to reduce product losses in the period after a well has been stimulated.

It is also desirable, so far as it is consistent with the first goal, to achieve a low concentration of methane in the fracturing gas rich stream, as this also decreases product loss. Further goals are to control the energy usage of the process and to reduce the environmental impact of hydraulic fracturing by reducing the amount of gas flared or vented after fracturing.

Figure 1:
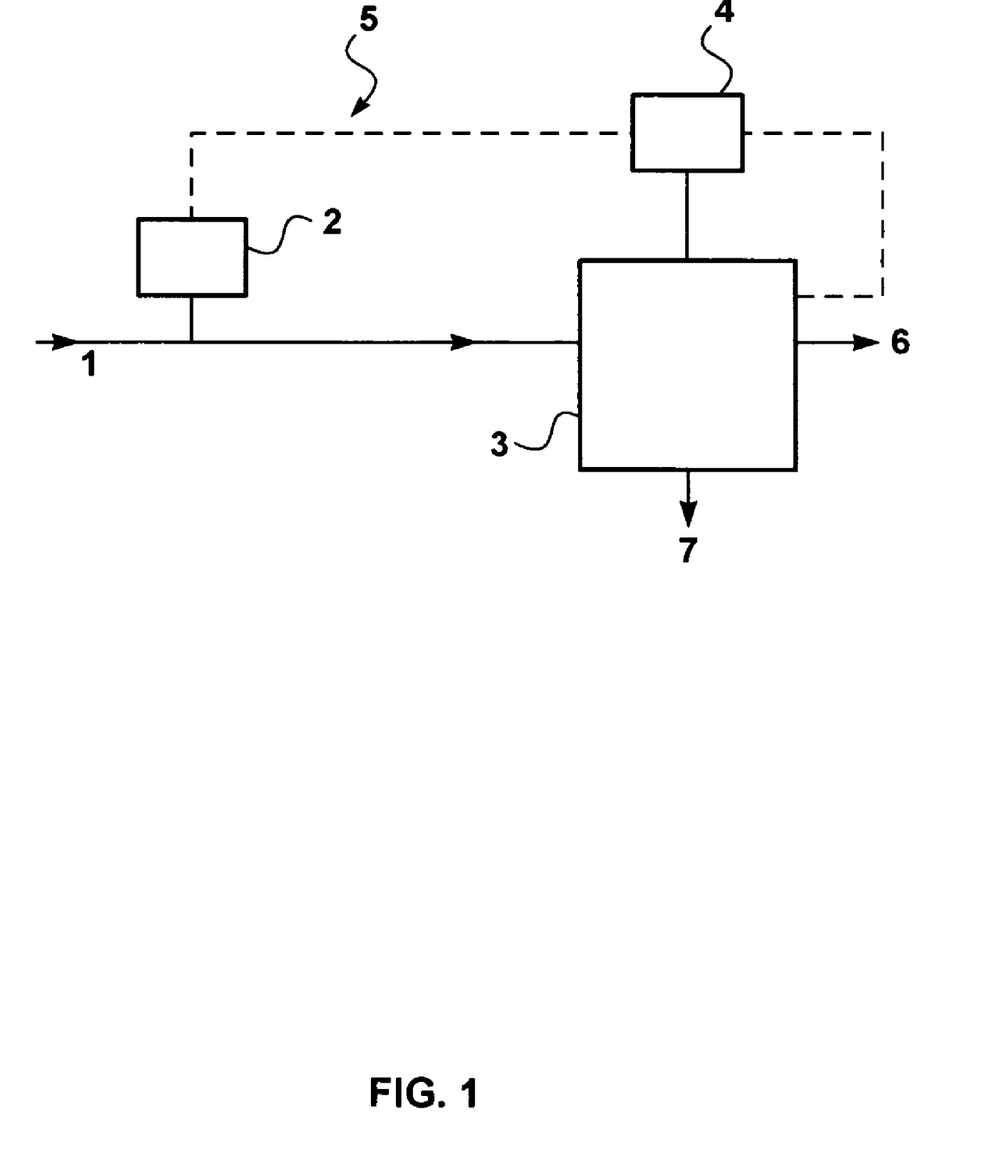
FIG. 1 is a schematic representation of a basic embodiment of the invention.

The process in a basic form is shown schematically in FIG. 1. Referring to this figure, raw feed gas stream, 1, is taken from a well after the well has been stimulated and introduced into the process. One or more of the fracturing gas concentration of the gas, the flow rate of the gas and the pressure of the gas are measured by automatic monitoring means, 2. The nature of the monitoring means depends on the gas property to be measured. If the gas composition is to be measured, the monitoring means is preferably an in-line gas chromatograph (GC). If the flow rate or pressure are to be measured, the monitoring means should include an appropriate in-line flow or pressure sensors or gauges.

It is preferred that the monitoring means also monitors the composition of the treated natural gas stream leaving the process, to check that it remains within the process specification.

The monitoring means should preferably be automatic and programmed to take measurements at frequent intervals, such as, but not necessarily, hourly or half-hourly. If desired, measurements can be taken every few minutes or less, to provide essentially continuous monitoring, although this is not normally necessary.

Less preferably, the automatic monitoring means can be replaced by manual monitoring by an operator at intervals.

Monitoring or measurement of the fracturing gas concentration, in the feed or product streams, or any other stream, may be done either directly, or indirectly by measuring the concentration of one or more other gas components and calculating the fracturing gas concentration. It may also be useful in some circumstances to measure the combined concentration of the fracturing gas and one or more other components, such as total inerts, or nitrogen plus carbon dioxide, for example. In the present context, any such method is intended to be within the scope of the invention.

The feed gas passes into the membrane array 3. The membranes of the array may take any convenient form and be housed in any convenient manner. The membranes are preferably polymeric composite membranes. The making of these types of membranes is well known in the art. The membranes may take any form, such as hollow fibers, which may be potted in cylindrical bundles into hollow-fiber modules, or flat sheets, which may be mounted in plate-and-frame modules or formed into spiral-wound modules.

The individual modules or elements are usually connected end-to-end, typically in a line of up to about six modules, within a single pressure vessel or tube. The tubes are then connected in banks to form individual steps or stages of the unit.

The membrane array may be configured in any convenient manner known to those of skill in the art, such as a one-stage arrangement, a two-stage arrangement, a two-step arrangement or a combination of two or more stages and steps. Preferred arrangements are described below with respect to FIGS. 2-5. The most preferred arrangement is a two-stage arrangement in which each stage is also divided into two steps, so that the array has four banks of membrane modules or tubes.

The gas is processed in the array to separate the feed gas into discharge stream 6, enriched in fracturing gas compared with feed gas stream 1 and treated natural gas product stream, 7. Any membranes able to achieve this separation can be used. If the membranes are selective in favor of the fracturing gas over methane, then stream 6 will be a permeate stream, at lower pressure than the feed gas, and treated natural gas stream 7 will remain at roughly the pressure of the feed gas to the membrane array.

If the membranes are selective in favor of methane over the fracturing gas, then stream 6 will be a residue stream and treated natural gas stream 7 will be a permeate stream at lower pressure than the feed gas. In this case, it is preferred that the permeate stream be maintained at a moderately elevated pressure, such as about 100 psia, to facilitate pooling with other gas in the field.

We believe the process of the invention is particularly useful in treating natural gas streams in which nitrogen is the fracturing gas. As mentioned in the summary section above, both nitrogen-selective membranes and methane-selective membranes are available in the art. As a methane-selective membrane, we prefer to use membranes in which the selective layer is silicone rubber. As a nitrogen-selective membrane, the fluorinated dioxole membranes taught in U.S. Pat. No. 6,579,341 may be used. In general, we prefer to use methane-selective membranes.

We also believe the process of the invention to be useful in treating natural gas streams in which carbon dioxide is present as the fracturing gas. All commercial polymeric membranes are selective to carbon dioxide over methane, so in this case the natural gas product stream will always be the residue stream from the membrane array and the carbon dioxide rich stream will always be the permeate stream.

As a carbon-dioxide-selective membrane, we prefer to use the fluorinated dioxole membranes mentioned above. Their use in treating streams containing carbon dioxide is taught in U.S. Pat. No. 6,572,680.

Automatic control system, 4, controls the operation of the process. The control system is connected by process control circuitry, indicated generally by all dashed lines, 5, in the figure, to the monitoring means and the membrane array.

Most preferably, the control system comprises a programmable controller and one or more automatic valves. The control system is able to receive signals from and send signals to other parts of the equipment, and is programmed to open and close the valves either fully or partially in response to signals from the monitoring system, or at preset times.

Preferably the process control system is programmed with at least the control logic necessary for the apparatus to carry out start-up and shut-down of the process, and to vary at least one operating parameter within the process, such as the flow rate of one or more recycle streams, the pressure on the feed side of the membranes, or the amount of on-stream membrane area. It is also desirable that the process control system permit operator input to allow the apparatus to be used in nonstandard modes if required.

Although most preferred, an integrated programmable control system is not essential to the invention. Other types of control mechanisms could achieve the desired set of processing steps. As non-limiting examples, other possible mechanisms include:

(a) a non-programmable electronic controller "hard-wired" to carry out the required process sequences,
(b) an electromechanical or mechanical controller. An example would be a controller incorporating one or more switches, which changes the valve settings in response to gas pressure or flow rate,
(c) individually operated valves that open and close in response to sensory input, at preset times or in response to some other stimulus, and
(d) manually operated valves.

Valves may be positioned in the incoming feed line to the process, the discharge lines from the process or in any internal process lines. Preferred arrangements are described below with respect to FIGS. 2-5

As a first representative, non-limiting example, it is preferred to position a valve in the feed line bringing the raw natural gas to be treated into the process. The control logic may then be programmed to open this valve when the fracturing gas concentration in the feed gas has reached a predetermined target value, thereby starting the treatment process.

For example, when production is first started again after stimulation, the fracturing gas concentration in the raw gas for the first few hours may make it uneconomical or impractical to treat the gas. The monitoring system may then be used to measure the concentration, and start the system when the concentration has fallen to 60 vol %, 50 vol %, 30 vol % or other chosen value.

Likewise, the control logic may be programmed to close the feed valve to stop the process when the fracturing gas concentration in the feed gas has dropped to a second predetermined target value, for example 10 vol %, 8 vol % or lower.

As a second example, a pressure-regulating valve may be positioned in the residue discharge line from the membrane array. This option will frequently be needed, as the flow rate of gas from a recently stimulated well varies substantially over time. A flow spike typically occurs within the first few hours after stimulation and is followed by a progressive decline in flow rate, although the decline may or may not be steady.

In this situation, the control logic may be programmed to open the pressure-regulating valve by a certain amount in response to a drop in flow rate of the incoming raw feed gas or an increase in the pressure.

As a third example, valves may be positioned in one or more recycle lines within the process. By recycling more or less gas within the process, optionally in multiple stages and in conjunction with the other controls discussed herein, very good control of the fracturing gas content of the treated natural gas and of the methane recovery of the process can be achieved. This mode of operation is particularly preferred and is illustrated and explained more fully in FIGS. 2 and 3 and the accompanying text below, as well as in the Examples.

Figure 5:
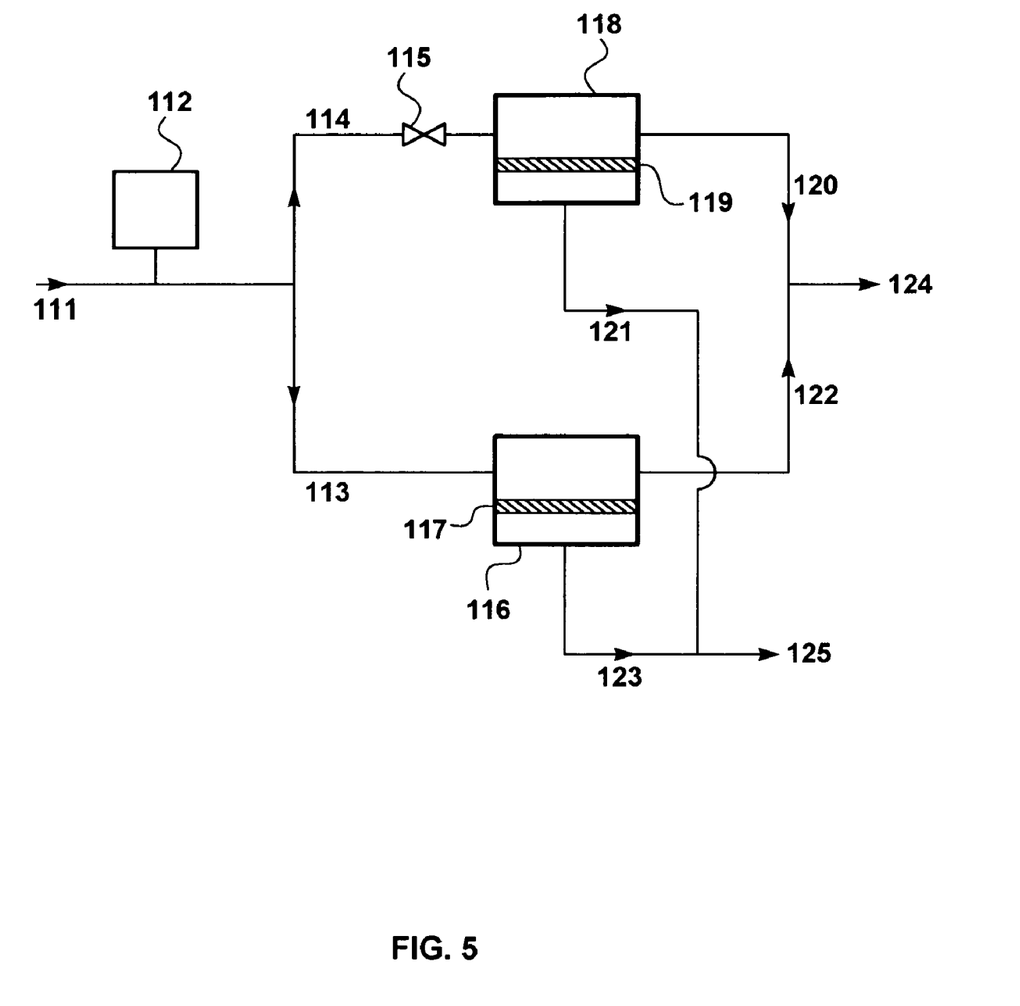
FIG. 5 is a schematic representation of an embodiment of the invention in which a single membrane stage with two parallel set of membrane modules is used in conjunction with a manually controlled valve.

As a fourth example, one or more control valves may be used to shut off one or more modules or tubes. The process controller may then be programmed to open or close the individual valves in response to changing gas flow or change in the raw gas composition. This control mode may be used in addition to other modes to provide finer control possibilities, as shown in FIG. 3, or as an alternative to other control modes for very simple control, as shown in FIG. 5.

Figure 2:
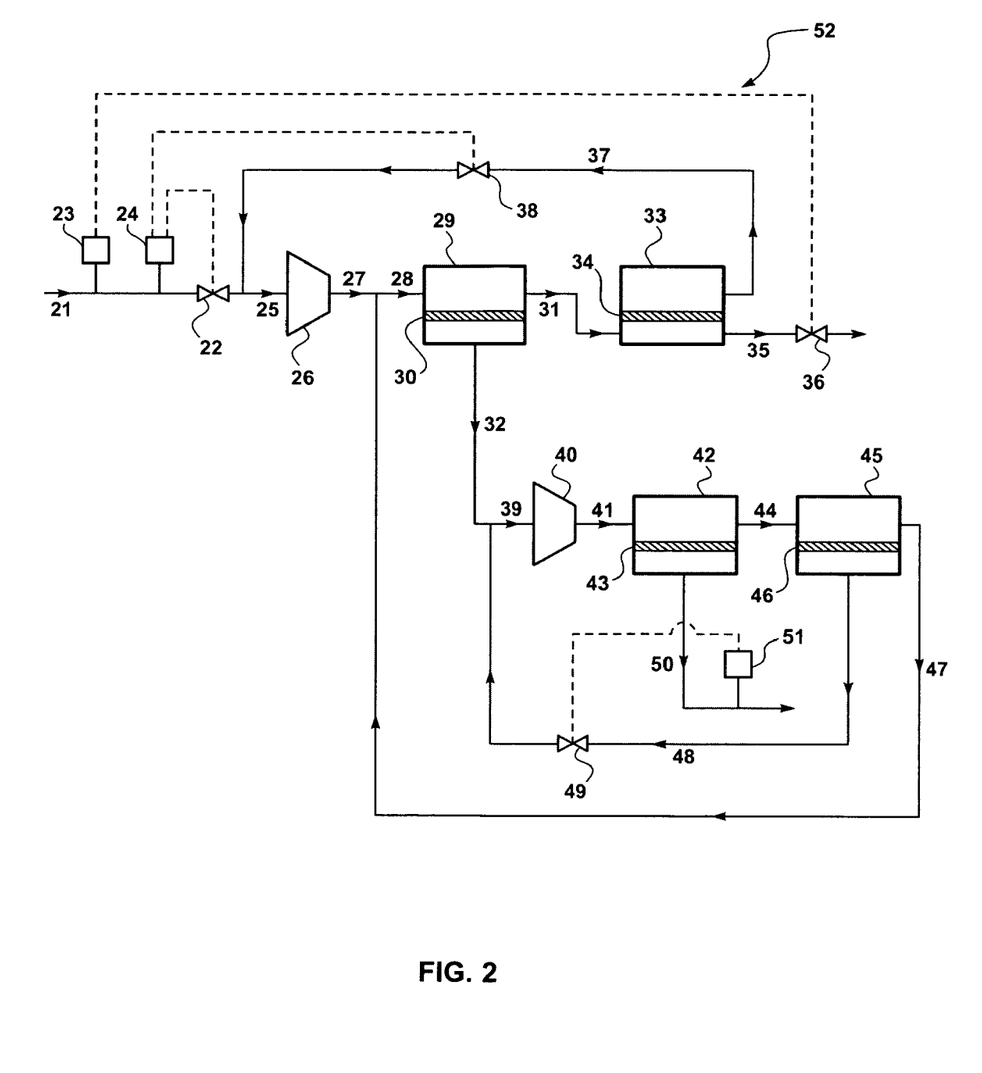
FIG. 2 is a schematic representation of an embodiment of the invention in which a two-step, two-stage membrane configuration of fixed membrane area is used in conjunction with an automated process control system.

A preferred embodiment of the invention using a membrane array with two stages and two steps is shown in FIG. 2. It will be appreciated by those of skill in the art that this figure, as well as FIG. 3-5, are simple schematic diagrams, intended to make clear significant aspects of the invention, and that an actual process train and equipment may include additional components of a standard type, such as heaters, chillers, phase separators, condensers, filters and the like.

Such equipment may be used to heat or cool gas streams, to remove contaminants, such as particulates, water or heavy hydrocarbons, before gas enters the membrane array, or to knock out liquids that form after gas has been compressed, example.

Figure 3:
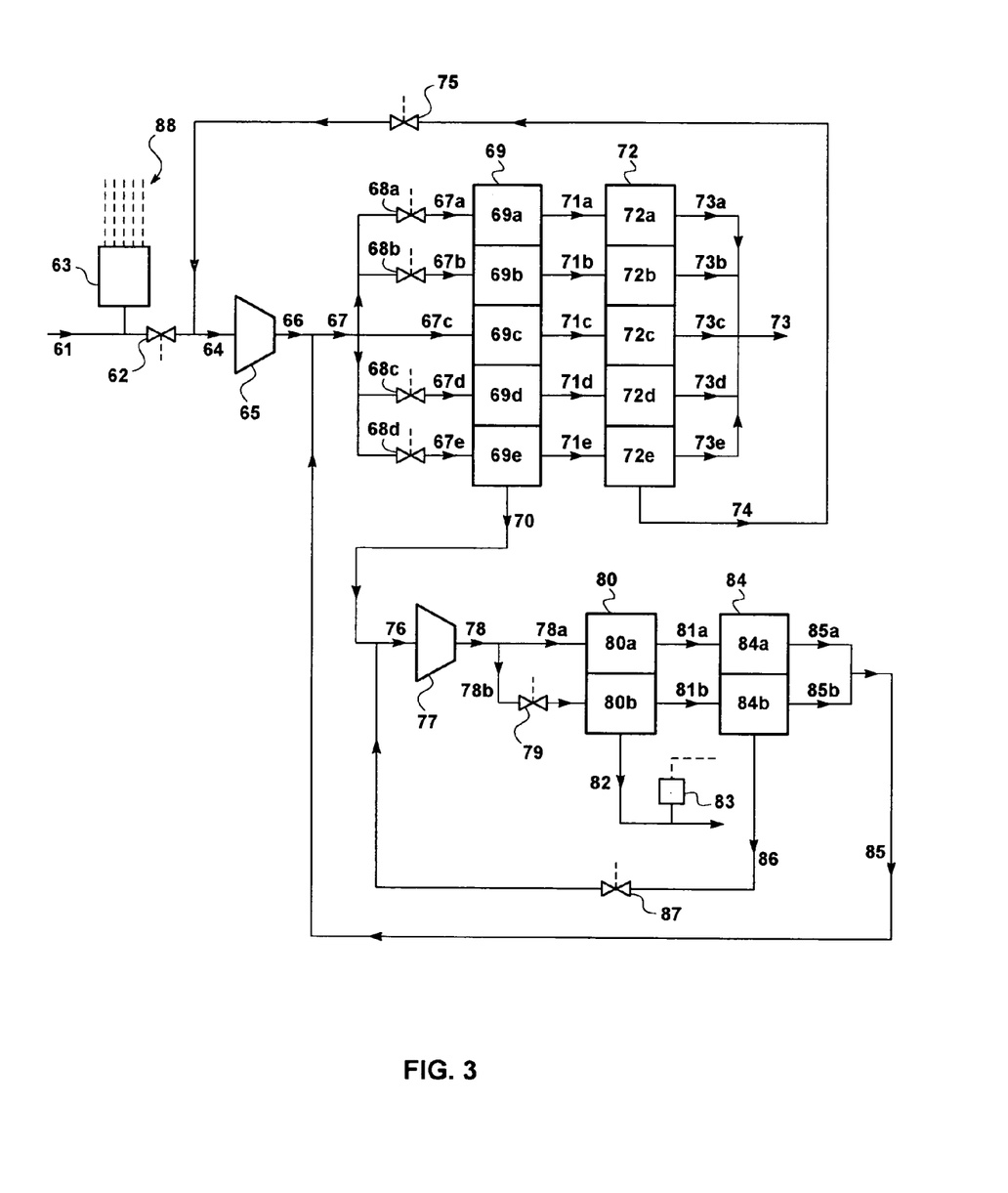
FIG. 3 is a schematic representation of an embodiment of the invention in which a two-step, two-stage membrane configuration of variable membrane area is used in conjunction with an automated process control system.
Figure 4:
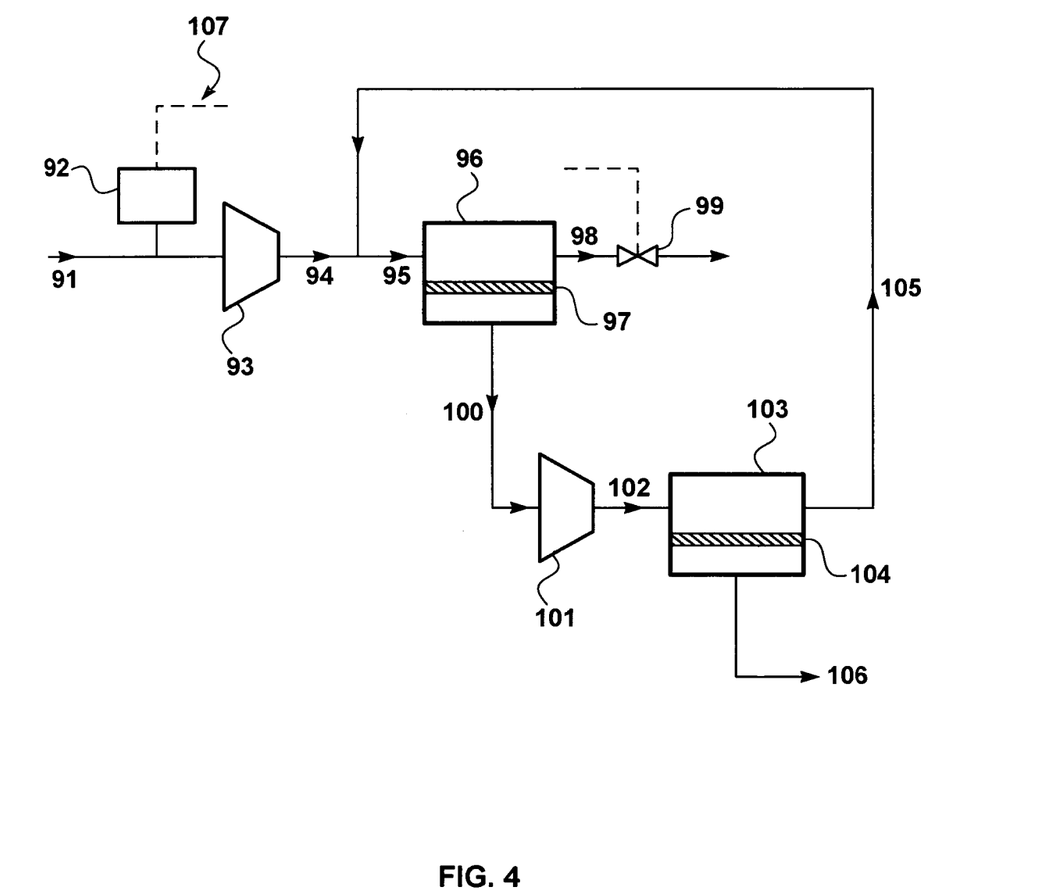
FIG. 4 is a schematic representation of an embodiment of the invention in which a two-stage membrane configuration of fixed membrane area is used in conjunction with an automated process control system.

Also, in FIGS. 2-4, for simplicity and to avoid many over-crossing lines, the automated process control system and circuitry is indicated only by dashed lines leaving the monitoring systems and valves.

Referring to FIG. 2, raw feed gas stream, 21, is a natural gas stream containing excess nitrogen from a well that has been subjected to hydraulic fracturing using nitrogen in the fracturing fluid.

The flow rate of the incoming gas is measured by flow monitor or sensor, 23, and the composition of the gas, or at least the concentration of nitrogen in the gas, is measured by GC, 24.

Valve 22 may remain closed until the GC measurements indicate that the nitrogen content in stream 21 has reached a chosen concentration. At this point, the control system and circuitry, 52, sends a signal to open valve 22 and admit gas to the process.

At the end of the process, when measurements indicate that the nitrogen content in stream 21 has fallen to an acceptable level and processing in no longer required, a signal is sent in like fashion to close valve 22, stop the process and route gas directly to the product line.

The incoming raw gas stream is combined with internal recycle stream, 37, to form inlet stream, 25, to compression step, 26. In this embodiment, the raw feed gas is assumed to be at only a moderate pressure of a few hundred pounds, such as 200 psia or 300 psia. Compressing the gas to a higher pressure facilitates operation of the membrane separation steps and enables the permeate stream that is the treated natural gas product to be delivered at pressure to gas gathering lines, a gas pipeline or other destination.

The compression step may be carried out in one or multiple stages, and will normally include standard compression features familiar to those of skill in the art, such as after-cooling and spill-back control.

Although the gas may be compressed to any pressure, a representative and typical pressure is about 500 psia.

Compressed stream, 27, is combined with internal recycle stream, 47, to form feed stream, 28, to the membrane array.

In this embodiment, the membrane array is configured in the most preferred arrangement of two membrane stages, each divided into two membrane steps. The first stage comprises first membrane step or bank, 29, containing membranes, 30, and second membrane step or bank, 33, containing membranes, 34. The second stage comprises third membrane bank, 42, containing membranes, 43, (this bank constitutes the first step of the second stage), and fourth membrane bank, 45, containing membranes, 46, (this bank constitutes the second step of the second stage).

Stream 28 enters the first bank of membrane modules, where it is processed and separated into first residue stream, 31, enriched in nitrogen compared with stream 28, and first permeate stream, 32, depleted in nitrogen and enriched in methane compared with stream 28.

The pressure of stream 32 on the permeate side is typically about 100-150 psia. The ratio of the pressure on the feed side to the pressure on the permeate side in a membrane separation step is referred to as the pressure ratio. A very high pressure ratio is not required for separating nitrogen from methane, because separation is controlled by the relatively low membrane selectivity of about 3.

If the process were being used to separate carbon dioxide from methane, a higher pressure ratio would be preferred to be comparable with the carbon dioxide/methane selectivity, which is typically about 10-15 or more.

Stream 31, which remains at about the same pressure as stream 28, subject only to any slight pressure drop along the membrane modules of the first bank, is passed as feed to second bank of membrane modules 33, where it is processed and separated into second residue stream, 35, and second permeate stream, 37.

Stream 35 is the most nitrogen-rich stream of the process and is discharged from the process through residue discharge back pressure control valve, 36. This discharge stream often contains more than 50 vol % nitrogen. In very favorable cases, where the nitrogen content is extremely high, or where further processing capabilities are available, the nitrogen can be recovered for reuse. Otherwise, as described above, the gas may frequently be useful as fuel gas for running field engines or the like, or may be sent to any other use or destination.

If, at any time during the process, flow monitor 23 detects that the flow rate, and hence pressure, of incoming gas stream 21 has changed, a signal is sent to pressure control valve, 36. The valve is then opened or closed further to regulate the pressure on the feed sides of membrane banks 33 and 29 to compensate for the change of pressure of the incoming stream.

Second permeate stream, 37 is recirculated within the process though flow control valve, 38. The signals sent as a result of gas sampling by GC 23 are used by the process control system to control the flow rate of stream 37. As the nitrogen concentration in stream 21 decreases, valve 38 will be closed slightly. This reduces the volume flow rate of recycle gas, and hence of gas over the membrane surface in first membrane step. The result is that more gas permeates membrane 30, increasing the volume flow of permeate stream 32.

Conversely, if the nitrogen concentration increases for any reason, valve 38 will be opened further to increase recycle of permeate stream 37, and reduce flow of permeate 32.

Permeate stream 32 passes as feed to the second stage of the membrane unit. Here it is combined with recycle stream, 48, to form second stage inlet stream, 39, and recompressed in compression step, 40. The same features and preferences discussed above for compression step 26 apply to compression step 40.

Compressed gas stream, 41, is passed as feed to the third bank of membrane modules, 42, containing membranes, 43. This bank of modules forms the first step of the second membrane stage. Stream 41 is processed and separated into third residue stream, 44, and third permeate stream, 50.

Stream 50 is the most methane-rich stream of the process and is discharged from the process as the treated natural gas product stream.

The nitrogen content or the full composition of stream 50 is sampled by means of GC, 51, which may be a dedicated instrument, but more preferably is the same instrument as GC, 24. The sampling signal is used by the process control system to regulate the setting of flow control valve, 49, and thereby to maintain the nitrogen content of the product stream at a target value.

Third residue stream 44 is passed as feed to fourth bank of membrane modules 45, containing membranes, 46. This bank of modules forms the second step of the second membrane stage. Stream 44 is processed and separated into fourth residue stream, 47, and fourth permeate stream, 48. Fourth residue stream, 47, is recirculated to the inlet side of the first membrane bank as shown. Fourth permeate stream 48 is recycled within the second stage after it has been recompressed in compression step 40.

As mentioned above, the flow volume of stream 48 is moderated by valve 49. By adjusting this flow rate, more or less gas is recirculated. In conjunction with adjustment of the flow rate from the first stage to the second stage through permeate stream 32, as described above, this enables the process control logic to maintain the target concentration of nitrogen in the product gas. The recovery of methane in the product stream is also controlled in this manner.

An alternative preferred embodiment of the invention, again using a membrane array with two stages and two steps, but this time varying the on-stream membrane area, is shown in FIG. 3. The features and preferences described for the embodiment of FIG. 2 also apply generally to FIG. 3, except as described otherwise.

Referring to FIG. 3, raw feed gas stream, 61, is withdrawn from the well. Monitoring system, 63, which includes a GC, a flow monitor or preferably both, measures the nitrogen content of the feed gas, the flow rate of the gas or both.

Valve 62 opens or closes in response to the nitrogen content of stream 61, in the same manner as described above with respect to valve 22 in FIG. 2, by means of process control system and circuitry, 88.

The incoming raw gas stream is combined with internal recycle stream, 74, to form inlet stream, 64, to compression step, 65.

Compressed stream, 66, is combined with internal recycle stream, 85, to form feed stream, 67, to the membrane array. The membrane array is configured as in FIG. 2, with two stages, each having two steps, so that there are four banks of membrane modules in total.

In this case, the first bank of membrane modules, 69, is assumed to use five separate pressure vessels or tubes of membrane modules, identified as 69a-69e. Feed stream 67 is split into five streams, 67a-67e, one stream for each vessel or tube. Valves 68a-68d are provided at the inlets to the tubes, so that tubes 69a, 69b, 69d and 69e may each be closed off independently. Optionally, a valve could also be provided at the inlet to tube 69c, enabling the whole stage to be shut down.

When all the valves are open, streams 67a-67e enters the first bank of membrane modules, where they are processed and separated into first residue streams, 71a-71e, and permeate stream, 70, which is the pooled permeate stream from each individual tube.

Streams 71a-71e are passed as feed to the second bank of membrane modules, 72, again divided into five tubes, 72a-72e. The streams are processed and separated into second residue streams, 73a-73e, and pooled second permeate stream, 74. The second residue stream are pooled to form stream, 73, the nitrogen rich stream, which is discharged from the process.

Second permeate stream, 74, is recirculated within the process though flow control valve, 75, which is operated in the same manner as described for valve 38 in FIG. 2.

Additional process control features are provided in the embodiment of FIG. 3 by valves 68a-d. As one or both of the nitrogen content and the flow rate of the raw feed gas decreases, one or more membrane pressure vessels can be taken off-line by shutting one or more of valves 68a-68d. The result is to reduce gas recycling in the permeate recycle loop created by stream 75.

Permeate stream 70 passes as feed to the second stage of the membrane unit. Here it is combined with recycle stream, 86, to form second stage inlet stream, 76, and recompressed in compression step, 77.

Compressed gas stream, 78, is passed as feed to the third bank of membrane modules, 80. This bank of membrane modules is assumed to use two separate pressure vessels or tubes of membrane modules, 80a and 80b. Feed stream 78 is split into two streams, 78a and 78b, one stream for each vessel or tube. Valve 79 is provided at the inlet to tube 80b, enabling the tube to be taken off-line. A valve could also be provided at the inlet to tube 80a, so that the whole of the second stage could be shut down.

When valve 79 is open, streams 78a and 78b are processed and separated into third residue streams, 81a and 81b, and pooled third permeate stream, 82.

Stream 82 is the most methane-rich stream of the process and is discharged from the process as the treated natural gas product stream. The nitrogen content or the full composition of stream 82 is sampled by means of GC, 83, and the sampling signal is used by the process control system to regulate the setting of flow control valve, 87, in the same manner as described above for valve 49 of FIG. 2.

Third residue streams, 81a and 81b, are passed as feed to the fourth bank of membrane modules, 84, again divided into two tubes, 84a and 84b. The streams are processed and separated into fourth residue streams, 85a and 85b, which are combined and recirculated as shown, and pooled fourth permeate stream, 86. Fourth permeate stream, 86, is recirculated within the process though flow control valve, 87.

A less preferred embodiment of the invention that provides process control only by means of a back pressure regulating valve in the residue discharge line is shown in FIG. 4. This configuration can control the concentration of nitrogen in the product natural gas stream to meet the same target values as the embodiments of FIG. 2 or 3, but does so at the expense of more recycle within the system and correspondingly higher compressor horsepower requirements. The general features and preferences for the process are the same as for the embodiments of FIGS. 2 and 3 unless described otherwise.

Referring to FIG. 4, incoming raw gas stream, 91, enters the process. The flow rate, pressure and/or composition of the stream are measured by monitoring system, 92, and the gas enters the suction side of compression step, 93.

Compressed gas stream, 94, is combined with internal recycle stream, 105, to form feed stream, 95, to the membrane array. In this embodiment, the membrane array is configured as two stages, with each stage having just a single step. Stream 95 enters the first membrane stage, 96, containing membranes, 97, where it is processed and separated into first residue stream, 98, enriched in nitrogen compared with stream 95, and first permeate stream, 100, depleted in nitrogen and enriched in methane compared with stream 95.

Stream 98 is discharged from the process through residue discharge back pressure control valve, 99. As the flow rate, nitrogen concentration or pressure of stream 91 changes, as detected by monitoring system 92, a signal is sent to valve 99 by means of the process control system and circuitry, indicated by dashed lines, 107, and the valve is further closed or opened as determined by the process control protocol to compensate for the changes.

Permeate stream 100 is recompressed in compression step, 101, and passes as feed stream, 102, to the second stage membrane bank, 103, containing membranes, 104. Here the stream is processed and separated into second residue stream, 105, and second permeate stream, 106. Stream 106 is the treated product natural gas stream and is discharged from the process.

Second residue stream 105 is recirculated to the inlet side of the first membrane bank as shown.

Another very simple embodiment using only one membrane stage of variable membrane area, operated by manual control, is shown in FIG. 5. In this case, no compression is used and there is no recycle, so the process uses no energy beyond what may be needed to pump gas along the lines. However, the level of process control that can be achieved is limited.

Referring to FIG. 5 incoming raw gas stream, 111, enters the process. The flow rate, pressure and/or composition of the stream are measured by monitoring system, 112. In this embodiment, a single membrane stage is used, split into first bank of membrane modules, 116, containing membranes, 117, and second bank of membrane modules, 118, containing membranes, 119. A valve, 115, is provided at the inlet to bank 118, so that these membrane modules may be taken off-line.

Feed stream 111 is split into two streams, 113 and 114, directed to the banks of modules as shown. Stream 113 enters modules 116 and is separated into residue stream, 122, and permeate stream, 123. When the valve is open, stream 114 enters modules 118 and is separated into residue stream, 120, and permeate stream, 121. The two residue streams are combined and discharged from the process as stream, 124, and the permeate streams are combined and discharged from the process as stream, 125.

As the flow rate, nitrogen concentration or pressure of stream 111 changes, as detected by monitoring system 112, an operator closes valve 115 to take module bank 118 off-line.

In another aspect, the invention is the apparatus used to carry out the processes described above, and is represented by the figures already discussed.

For example, in the case of the FIG. 2 embodiment, the apparatus includes inlet line, 21, in which are positioned feed control valve, 22, flow monitor, 23, and concentration monitor, 24. The inlet line is connected to the inlet or suction side of compressor, 26, by compressor feed line, 25.

Compressor exhaust line, 27 is connected to membrane inlet line, 28, through which gas may pass to first bank of membrane modules, 29, containing membranes, 30. Line, 31, joins the residue outlet of module bank 29 to the feed side of second bank of membrane modules, 33, containing membranes, 34.

Line 37 connects the outlet from the permeate side of module bank 33 to the suction side of compressor 26 by means of line 25. Flow control valve, 38, is positioned in line 37, and connected to concentration monitor 24 by automated process control means, 52.

Line 35 is a residue discharge line from module bank 33. Back-pressure regulating valve, 36, positioned in line 35, is connected to flow monitor 23 by automated process control means 52.

Line, 32, connects the outlet from the permeate side of module bank 29 to the suction side of compressor, 40, by means of line 39. Compressor exhaust line, 41 is connected to third membrane module bank, 42, so that compressed gas may pass to the feed side of the membranes, 43. Line, 44, joins the residue outlet of module bank 42 to the feed side of the fourth bank of membrane modules, 45, containing membranes, 46.

Line, 47, is a recycle line connecting the residue outlet of module bank 45 to membrane inlet line 28. Line, 48, is a recycle line connecting the permeate outlet of module bank 45 to the suction side of compressor, 40, by means of line 39. Flow control valve, 49, is positioned in line 48 and connected to concentration monitor, 51, by automated process control means, 52.

Line, 50, is the permeate discharge line through which treated natural gas is discharged from the process. Concentration monitor, 51, is positioned in line 50 to monitor the composition of the product gas.

The invention is now illustrated in further detail by specific examples. These examples are intended to further clarify the invention, and are not intended to limit the scope in any way.

EXAMPLES

Example 1

Embodiment of FIG. 2

Computer calculations were performed with a modeling program, ChemCad 5.5 (ChemStations, Inc., Houston, Tex.), to illustrate the process of the invention for removal of nitrogen after stimulation of a natural gas well. The process was assumed to be carried out as shown in FIG. 2.

To model the behavior of a process control system varying process parameters in response to changing feed gas properties, a series of calculations was performed for natural gas containing a fracturing gas content varying from 31 vol % nitrogen to 12 vol % nitrogen. The target was to reduce the nitrogen content in the product stream to about 10 vol % under all conditions, so that the gas could be pooled with gas from other wells that are in regular production mode.

Secondary targets were to achieve high levels of gas recovery into the product stream, and to control the amount of compressor horsepower used by the process.

Calculation 1: Raw gas composition: 31 vol % nitrogen. Feed gas flow rate: 3.5 MMscfd.

The results of the calculation are shown in Table 1.

TABLE 1

| | Stream | | | | | | |
|---|---|---|---|---|---|---|---|
| | 21 (Feed gas) | 28 | 35 (Discharge) | 32 | 41 | 47 | 50 (Product gas) |
| Flow (MMscfd) | 3.5 | 8.0 | 1.3 | 3.9 | 7.2 | 1.7 | 2.2 |
| Temp (° F.) | 120 | 114 | 89 | 109 | 120 | 95 | 116 |
| Pressure (psia) | 315 | 497 | 458 | 115 | 515 | 497 | 103 |
| Component (vol %) | | | | | | | |
| Nitrogen | 31 | 34 | 66 | 21 | 18 | 37 | 9.3 |
| Methane | 68 | 66 | 33 | 77 | 81 | 62 | 89 |
| Carbon Dioxide | 0.36 | 0.22 | <0.1 | 0.35 | 0.33 | 0.1 | 0.6 |
| Ethane | 0.85 | 0.58 | 0.1 | 0.86 | 0.85 | 0.3 | 1.3 |
| Propane | <0.1 | <0.1 | <0.1 | <0.1 | <0.1 | <0.1 | <0.1 |

As can be seen, the process is able to meet the target composition for the product gas stream. The process uses 1,100 m² of membrane area and 1,200 hp of compressor power. The feed pressure for the first membrane stage is about 500 psia, to the second membrane stage is about 500 psia, and the product gas is discharged at about 100 psia. The recovery of product gas is about 60%.

Calculation 2: Inlet gas composition: 20 vol % nitrogen. Feed gas flow rate: 2.8 MMscfd.

The calculation was repeated assuming that the nitrogen content of the feed gas has dropped to 20 vol % and the feed gas flow rate has dropped to 2.8 MMscfd.

The membrane area remains fixed at 1,100 m². Valves 38, 49 and 36 were assumed to be adjusted by the process control system, so that the recycle flow of streams 37 and 48 is reduced, and the feed pressure for both membrane stages is now about 400 psia.

The results of the calculation are shown in Table 2.

TABLE 2

| | Stream | | | | | | |
|---|---|---|---|---|---|---|---|
| | 21 (Feed gas) | 28 | 35 (Discharge) | 32 | 41 | 47 | 50 (Product gas) |
| Flow (MMscfd) | 2.8 | 6.2 | 0.5 | 5.5 | 7.5 | 3.3 | 2.3 |
| Temp (° F.) | 120 | 114 | 91 | 104 | 120 | 108 | 117 |
| Pressure (psia) | 305 | 397 | 374 | 115 | 415 | 397 | 103 |
| Component (vol %) | | | | | | | |
| Nitrogen | 20 | 25 | 65 | 21 | 19 | 28 | 10 |
| Methane | 79 | 74 | 35 | 78 | 80 | 71 | 88 |
| Carbon Dioxide | 0.5 | 0.3 | <0.1 | 0.3 | 0.3 | 0.1 | 0.5 |
| Ethane | 1.0 | 0.7 | 0.1 | 0.8 | 0.8 | 0.4 | 1.2 |
| Propane | <0.1 | <0.1 | <0.1 | <0.1 | <0.1 | <0.1 | <0.1 |

As can be seen, the process is able to meet the target composition for the product gas stream. The process uses 950 hp of compressor power. The recovery of product gas has increased to about 80%.

Calculation 3: Inlet gas composition: 12% nitrogen. Feed gas flow rate: 2.0 MMscfd.

The calculation was repeated assuming that the nitrogen content of the feed gas has dropped to 12 vol % and the feed gas flow rate has dropped to 2.0 MMscfd.

As the feed gas nitrogen concentration has now dropped almost to the target value, the permeate stream, 32, produced by the first membrane stage now meets target, so the gas was assumed to be withdrawn from this line, with no processing carried out in the second stage.

Valves 38 and 36 were assumed to be adjusted by the process control system, so that the recycle flow of stream 37 is increased, and the feed pressure for the first membrane stage is now about 300 psia.

The results of the calculation are shown in Table 3.

TABLE 3

| | Stream | | | | | | |
|---|---|---|---|---|---|---|---|
| | 21 (Feed gas) | 28 | 35 (Discharge) | 32 (Product gas) | 41 | 47 | 50 |
| Flow (MMscfd) | 2.0 | 4.4 | 0.1 | 1.9 | n/a | n/a | n/a |
| Temp (° F.) | 120 | 120 | 99 | 117 | n/a | n/a | n/a |
| Pressure (psia) | 190 | 315 | 297 | 115 | n/a | n/a | n/a |
| Component (vol %) | | | | | | | |
| Nitrogen | 12 | 16 | 71 | 10 | n/a | n/a | n/a |
| Methane | 86 | 82 | 29 | 89 | n/a | n/a | n/a |
| Carbon Dioxide | 0.6 | 0.3 | <0.1 | 0.5 | n/a | n/a | n/a |
| Ethane | 1.1 | 0.8 | <0.1 | 1.1 | n/a | n/a | n/a |
| Propane | <0.1 | <0.1 | <0.1 | <0.1 | n/a | n/a | n/a |

As can be seen, the process is able to meet the target composition for the product gas stream. The process uses 300 hp of compressor power. The recovery of product gas has increased to about 95%.

Calculations were also performed for the 25 vol % nitrogen in the feed and 15 vol % nitrogen in the feed cases. These cases are not shown in detail.

A comparison was made of the gas recycle within the system and the compressor horsepower required as a result for the five cases. The results are summarized in Table 4.

TABLE 4

| Feed $N_2$ | Compression power required (hp) | | | Compressor discharge | Permeate recycle flow (MMscfd) | |
|---|---|---|---|---|---|---|
| concentration (vol %) | Compressor 26 | Compressor 40 | Total | pressure (psia) | First stage (stream 37) | Second stage (stream 48) |
| 31 | 431 | 774 | 1,205 | 515 | 2.9 | 3.3 |
| 25 | 190 | 754 | 944 | 465 | 1.1 | 2.6 |
| 20 | 268 | 685 | 953 | 415 | 0.1 | 2.0 |
| 15 | 321 | 0 | 662 | 365 | 0.2 | 0 |
| 12 | 321 | 0 | 321 | 315 | 2.3 | 0 |

As can be seen, the compressor discharge pressure, compressor horsepower requirements and internal recycle flow rates within the system are all varied substantially in response to changes in the feed gas nitrogen concentration and declining feed gas flow rate.

Nevertheless, these widely changing conditions can be handled by the membrane unit and process of the invention.

Example 2

Variable Membrane Area: Embodiment of FIG. 3

Computer calculations were performed with ChemCad 5.5 to illustrate the process of the invention shown in FIG. 3. It was assumed that the first stage membrane banks, 69 and 72, each contain 5 tubes of membrane modules, exactly as shown in the figure, but that the second stage membrane banks, 80 and 84, each contain 7 tubes of membrane modules. It was assumed that a valve is provided at the inlet to every tube of the first steps, 69 and 80, of both stages, so that the number of tubes-on-stream can be varied from 0 to 12.

As with Example 1, series of calculations was performed for natural gas containing a fracturing gas content varying from 31 vol % nitrogen to 12 vol % nitrogen. The target was again to reduce the nitrogen content in the product stream to about 10 vol %, as well as to achieve high levels of gas recovery and control compressor horsepower used.

Calculation 1: Inlet gas composition: 31% nitrogen. Feed gas flow rate: 3.5 MMscfd.

The results of the calculation are shown in Table 5.

TABLE 5

| | Stream | | | | | | | | | |
|---|---|---|---|---|---|---|---|---|---|---|
| | 61 | 66 | 67 | 74 | 73 | 70 | 76 | 85 | 86 | 82 |
| Flow (MMscfd) | 3.5 | 6.4 | 8.1 | 3.0 | 1.3 | 3.9 | 7.2 | 1.7 | 3.3 | 2.2 |
| Temp (° F.) | 120 | 120 | 114 | 96 | 89 | 109 | 107 | 95 | 104 | 116 |
| Pressure (psia) | 315 | 515 | 497 | 115 | 458 | 115 | 115 | 497 | 115 | 103 |
| Component (vol %) | | | | | | | | | | |
| Nitrogen | 31 | 33 | 34 | 35 | 67 | 21 | 18 | 37 | 14 | 9.3 |
| Methane | 68 | 66 | 65 | 65 | 33 | 77 | 81 | 62 | 85 | 89 |
| Carbon Dioxide | 0.4 | 0.2 | 0.2 | 0.1 | <0.1 | 0.4 | 0.3 | 0.1 | 0.3 | 0.6 |
| Ethane | 0.9 | 0.7 | 0.6 | 0.4 | 0.1 | 0.7 | 0.8 | 0.3 | 0.8 | 1.3 |
| Propane | <0.1 | <0.1 | <0.1 | <0.1 | <0.1 | <0.1 | <0.1 | <0.1 | <0.1 | <0.1 |

Stream 61 is feed gas,
73 is residue discharge gas,
82 is product gas

As can be seen, the process is able to meet the target composition for the product gas stream. The process used all 12 first step tubes and 1,200 hp of compressor power. The feed pressure for both membrane stages is about 500 psia and the product gas is discharged at about 100 psia. The recovery of product gas is about 60%.

Case 2: Inlet gas composition: 20% nitrogen. Feed gas flow rate: 2.8 MMscfd.

The calculation was repeated assuming that the nitrogen content of the feed gas has dropped to 20 vol % and the feed gas flow rate has dropped to 2.8 MMscfd.

The membrane area was assumed to be reduced by closing two of the valves to the first steps of the first membrane stage, and one of the valves to the first steps of the second membrane stage. Valves 75 and 87 were assumed to be adjusted by the process control system, so that the recycle flow of streams 74 and 85 is reduced. As this embodiment does not have a pressure regulating valve on the residue discharge line, the feed pressure for both membrane stages remains at about 500 psia.

The results of the calculation are shown in Table 6.

As can be seen, the process is able to meet the target composition for the product gas stream. The process uses 9 out of 12 first step tubes and 970 hp of compressor power. The recovery of product gas is about 80%.

Case 3: Inlet gas composition: 12% nitrogen. Feed gas flow rate: 2.0 MMscfd.

The calculation was repeated assuming that the nitrogen content of the feed gas has dropped to 12 vol % and the feed gas flow rate has dropped to 2.0 MMscfd.

As the feed gas nitrogen concentration has now dropped almost to the target value, the membrane area was assumed to be reduced by closing three of the valves to the first steps of the first membrane stage, and three of the valves to the first steps of the second membrane stage.

TABLE 6

| | Stream | | | | | | | | | |
|---|---|---|---|---|---|---|---|---|---|---|
| | 61 | 66 | 67 | 74 | 73 | 70 | 76 | 85 | 86 | 82 |
| Flow (MMscfd) | 2.8 | 3.3 | 4.9 | 0.5 | 0.5 | 3.9 | 6.4 | 1.6 | 2.5 | 2.3 |
| Temp (° F.) | 120 | 120 | 112 | 85 | 80 | 101 | 102 | 96 | 104 | 116 |
| Pressure (psia) | 305 | 515 | 503 | 115 | 466 | 115 | 115 | 503 | 115 | 103 |
| Component (vol %) | | | | | | | | | | |
| Nitrogen | 20 | 24 | 28 | 42 | 68 | 21 | 18 | 37 | 15 | 9.8 |
| Methane | 78 | 75 | 71 | 58 | 32 | 78 | 80 | 63 | 84 | 89 |
| Carbon Dioxide | 0.4 | 0.4 | 0.3 | 0.1 | <0.1 | 0.3 | 0.3 | 0.1 | 0.3 | 0.5 |
| Ethane | 1.0 | 0.9 | 0.7 | 0.2 | 0.1 | 0.8 | 0.8 | 0.2 | 0.8 | 1.2 |
| Propane | <0.1 | <0.1 | <0.1 | <0.1 | <0.1 | <0.1 | <0.1 | <0.1 | <0.1 | <0.1 |

Stream 61 is feed gas,
73 is residue discharge gas,
82 is product gas

The results of the calculation are shown in Table 7.

TABLE 7

| | Stream | | | | | | | | | |
|---|---|---|---|---|---|---|---|---|---|---|
| | 61 | 66 | 67 | 74 | 73 | 70 | 76 | 85 | 86 | 82 |
| Flow (MMscfd) | 2.0 | 2.5 | 3.0 | 0.4 | 0.1 | 2.4 | 2.8 | 0.4 | 0.4 | 1.9 |
| Temp (° F.) | 120 | 120 | 114 | 80 | 70 | 103 | 102 | 94 | 94 | 110 |
| Pressure (psia) | 190 | 515 | 478 | 115 | 437 | 115 | 115 | 115 | 115 | 103 |
| Component (vol %) | | | | | | | | | | |
| Nitrogen | 12 | 17 | 21 | 40 | 82 | 15 | 16 | 18 | 18 | 10 |
| Methane | 86 | 81 | 78 | 60 | 18 | 84 | 83 | 81 | 81 | 89 |
| Carbon Dioxide | 0.5 | 0.4 | 0.3 | 0.1 | <0.1 | 0.4 | 0.4 | 0.2 | 0.2 | 0.5 |
| Ethane | 1.1 | 0.9 | 0.8 | 0.2 | <0.1 | 1.0 | 0.9 | 0.5 | 0.5 | 1.1 |
| Propane | <0.1 | <0.1 | <0.1 | <0.1 | <0.1 | <0.1 | <0.1 | <0.1 | <0.1 | <0.1 |

Stream 61 is feed gas,
73 is residue discharge gas,
82 is product gas

As can be seen, the process is able to meet the target composition for the product gas stream. The process uses 5 out of 12 first step tubes and 540 hp of compressor power. The recovery of product gas is about 95%.

Calculations were also performed for the 25 vol % nitrogen in the feed and 15 vol % nitrogen in the feed cases. These cases are not shown in detail.

A comparison was made of the gas recycle within the system and the compressor horsepower required as a result for the five cases. The results are summarized in Table 8.

TABLE 8

| Feed N$_2$ concentration (vol %) | Compression power required (hp) | | | Number of onstream membrane tubes stage1/stage2 | Permeate recycle flow (MMscfd) | |
|---|---|---|---|---|---|---|
| | Compressor 65 | Compressor 77 | Total | | First stage (stream 37) | Second stage (stream 48) |
| 31 | 431 | 774 | 1,205 | 5/7 | 2.9 | 3.3 |
| 25 | 268 | 704 | 972 | 4/7 | 1.7 | 3.1 |
| 20 | 331 | 640 | 971 | 3/6 | 0.5 | 2.5 |
| 15 | 350 | 408 | 7582 | 3/4 | 1.0 | 1.6 |
| 12 | 253 | 285 | 538 | 2/3 | 0.5 | 0.4 |

As can be seen, the compressor horsepower requirements and membrane area on-line are all varied substantially in response to changes in the feed gas nitrogen concentration and declining feed gas flow rate.

Nevertheless, these widely changing conditions can be handled by the membrane unit and process of the invention.

Example 3

Two single-step stages: Embodiment of FIG. 4: 20 vol % nitrogen in feed

Computer calculations were performed with ChemCad 5.5 to illustrate the process of the invention as shown in FIG. 4. It was assumed that the feed gas contained 20 vol % nitrogen, and the target concentration was again assumed to be about 10 vol %.

The results of the calculations are summarized in Table 9.

TABLE 9

| | Stream | | | | |
|---|---|---|---|---|---|
| | 91 | 95 | 98 | 100 | 106 |
| Flow (MMscfd) | 2.8 | 4.9 | 0.6 | 4.2 | 2.2 |
| Temp (° F.) | 120 | 114 | 87 | 101 | 114 |
| Pressure (psia) | 305 | 506 | 470 | 115 | 103 |

TABLE 9-continued

| | Stream | | | | |
|---|---|---|---|---|---|
| | 91 | 95 | 98 | 100 | 106 |
| Component (vol %) | | | | | |
| Nitrogen | 20 | 23 | 56 | 18 | 10 |
| Methane | 78 | 76 | 43 | 81 | 88 |
| Carbon Dioxide | 0.4 | 0.3 | <0.1 | 0.4 | 0.5 |
| Ethane | 1.0 | 0.8 | 0.1 | 0.9 | 1.2 |
| Propane | <0.1 | <0.1 | <0.1 | <0.1 | <0.1 |

As can be seen, the process can meet the target composition for the product gas stream. The process uses 521 hp of compressor power and the recovery of product gas is about 80%.

Example 4

Two single-step stages: Embodiment of FIG. 4: 15 vol % nitrogen in feed

The calculations of Example 3 were repeated, assuming the same system configuration. In this case, it was assumed that the feed gas contained 15 vol % nitrogen and that the target product gas nitrogen content was 8 vol %. The results of the calculations are summarized in Table 10.

TABLE 10

| | Stream | | | | |
|---|---|---|---|---|---|
| | 91 | 95 | 98 | 100 | 106 |
| Flow (MMscfd) | 2.2 | 2.3 | 1.0 | 1.3 | 1.2 |
| Temp (° F.) | 120 | 119 | 111 | 115 | 109 |
| Pressure (psia) | 305 | 365 | 340 | 153 | 103 |
| Component (vol %) | | | | | |
| Nitrogen | 15 | 16 | 23 | 11 | 8.1 |
| Methane | 83 | 82 | 76 | 87 | 90 |
| Carbon Dioxide | 0.4 | 0.4 | 0.3 | 0.5 | 0.6 |
| Ethane | 1.1 | 1.0 | 0.7 | 1.3 | 1.4 |
| Propane | <0.1 | <0.1 | <0.1 | <0.1 | <0.1 |

As can be seen, the process can meet the target composition for the product gas stream. The process uses 105 hp of compressor power and the recovery of product gas is about 55%.

Example 5

Two single-step stages: Embodiment of FIG. 4: 15 vol % nitrogen in feed, product 6 vol % nitrogen The calculations of Example 4 were repeated, assuming the same system configuration. In this case, it was assumed that the target product gas nitrogen content was 6 vol %. The results of the calculations are summarized in Table 11.

TABLE 11

| | Stream | | | | |
|---|---|---|---|---|---|
| | 91 | 95 | 98 | 100 | 106 |
| Flow (MMscfd) | 2.2 | 2.8 | 0.9 | 1.9 | 1.3 |
| Temp (° F.) | 120 | 102 | 104 | 109 | 112 |
| Pressure (psia) | 305 | 379 | 379 | 115 | 103 |
| Component (vol %) | | | | | |
| Nitrogen | 15 | 27 | 27 | 10 | 6.0 |
| Methane | 83 | 72 | 72 | 88 | 92 |
| Carbon Dioxide | 0.4 | 0.4 | 0.2 | 0.5 | 0.7 |
| Ethane | 1.1 | 1.0 | 0.5 | 1.2 | 1.5 |
| Propane | <0.1 | <0.1 | <0.1 | <0.1 | <0.1 |

As can be seen, the process can meet the target composition for the product gas stream. The process uses 206 hp of compressor power and the recovery of product gas is about 60%.

We claim:

1. A process for treating a natural gas stream produced by a well that has been recently stimulated using a fracturing gas, and that contains an undesirable amount of the fracturing gas, comprising:
   (a) providing a membrane unit comprising:
   (i) a membrane having a feed side and a permeate side;
   (ii) automatic monitoring means positioned in a gas flow line to the membrane unit to monitor at least a concentration of the fracturing gas in the natural gas, a flow rate of the natural gas or a pressure of the natural gas;
   (iii) automatic control means connected in signal-transferring relationship to the automatic monitoring means and adapted to adjust at least one operating parameter of the membrane unit;
   (b) passing the natural gas stream through the gas flow line and across the feed side as a feed stream;
   (c) providing a driving force for transmembrane permeation;
   (d) withdrawing from the membrane unit a first treated gas stream enriched in the fracturing gas compared with the feed stream;
   (e) withdrawing from the membrane unit a second treated gas stream depleted in the fracturing gas compared with the feed stream;
   (f) adjusting the operating parameter in response to a change in at least one of the concentration, the flow rate and the pressure.

2. The process of claim 1, wherein the automatic monitoring means is further adapted to monitor a product concentration of the fracturing gas in the second treated gas stream, and wherein the automatic control means is further adapted to adjust at least a second operating parameter of the membrane unit to maintain the product concentration at least approximately at a target value.

3. The process of claim 1, wherein the fracturing gas is nitrogen.

4. The process of claim 1, wherein the fracturing gas is carbon dioxide.

5. The process of claim 1, wherein the second treated gas stream is a residue stream from the membrane unit.

6. The process of claim 1, wherein the second treated gas stream is a permeate stream from the membrane unit.

7. The process of claim 1, wherein the automatic monitoring means comprises a gas chromatograph.

8. The process of claim 1, wherein the automatic monitoring means comprises a flow monitor.

9. The process of claim 1, wherein the automatic control means comprises an automatic valve in signal transferring relationship with the automatic monitoring means.

10. The process of claim 1, wherein the operating parameter is a volume gas flow.

11. The process of claim 1, wherein the operating parameter is a transmembrane pressure difference.

12. The process of claim 1, wherein the membrane is divided between multiple membrane modules and the operating parameter is the number of on-stream membrane modules.

13. The process of claim 1, wherein the automatic controls means starts the process when the undesirable amount drops to a first predetermined value.

14. The process of claim 1, wherein the automatic control means stops the process when the undesirable amount drops to a second predetermined value.

15. The process of claim 1, wherein the membrane comprises silicone rubber.

16. The process of claim 1, wherein the membrane comprises a fluorinated polymer.

17. The process of claim 1, wherein the membrane is divided between two membrane banks arranged in a two-stage configuration.

18. The process of claim 1, wherein the membrane is divided between four membrane banks arranged in a two-step, two-stage configuration.

19. The process of claim 1, wherein the flow rate is variable and the automatic control means is adapted to adjust an internal recycle stream flow rate to compensate for the variable flow rate.

20. The process of claim 1, wherein the concentration is variable and the automatic control means is adapted to adjust an internal recycle stream flow rate to compensate for the variable concentration.

21. The process of claim 2, wherein the target value is less than about 15 vol %.

22. The process of claim 1, wherein the undesirable amount is at least about 30 vol %.

23. A process for treating a natural gas stream produced by a well that has been recently stimulated using a fracturing gas, and that contains a changing concentration of fracturing gas, comprising:
(a) measuring the changing concentration at least periodically;
(b) compressing the natural gas stream;
(c) passing the compressed natural gas stream to a feed inlet of a membrane unit comprising a first membrane bank, a second membrane bank, a third membrane bank and a fourth membrane bank, the membrane banks being connected to allow gas flow at least from the first bank to the second and third banks, and from the third bank to the fourth bank;
(d) processing the natural gas stream in the first membrane bank to produce a first permeate stream at lower pressure than the compressed natural gas stream and a first residue stream;
(e) passing the first residue stream to the second membrane bank and there processing the first residue stream to produce a second permeate stream at lower pressure than the compressed natural gas stream and a second residue stream;
(f) discharging the second residue stream from the process;
(g) recompressing the first permeate stream;
(h) passing the recompressed first permeate stream to the third membrane bank and there processing the first permeate stream to produce a third permeate stream at lower pressure than the compressed natural gas stream and a third residue stream;
(i) discharging the third permeate stream from the process as a treated natural gas stream having a reduced concentration of fracturing gas;
(j) passing the third residue stream to the fourth membrane bank and there processing the third residue stream to produce a fourth permeate stream at lower pressure than the compressed natural gas stream and a fourth residue stream;
(k) recirculating the second permeate stream through a first control valve to step (b);
(l) recirculating the fourth residue stream to step (c);
(m) recirculating the fourth permeate stream through a second control valve to step (g);
(n) measuring the reduced fracturing gas concentration at least periodically;
(o) as the changing concentration changes, periodically adjusting a first setting of the first control valve to change the volume of gas flowing through the first control valve in response to a change in the changing concentration;
(p) if the reduced fracturing gas concentration deviates from a target value, periodically adjusting a second setting of the second control valve to change the volume of gas flowing through the second control valve.

24. The process of claim 23, wherein:
(A) the natural gas stream has a variable flow rate and the process further comprises measuring the variable flow rate at least periodically;
(B) the second residue stream is discharged through a pressure-regulating valve; and
(C) the process further comprises periodically adjusting a third setting of the pressure-regulating valve in response to a change in the variable flow rate to maintain a desired transmembrane pressure difference in the first and second membrane banks.

25. The process of claim 23, wherein steps (a), (n), (o) and (p) are performed by means of an automated process control system.

26. The process of claim 25, wherein the natural gas stream is not admitted to step (b) until the changing concentration as monitored in step (a) has reached a first chosen value.

27. The process of claim 25, wherein the process is automatically stopped when the changing concentration as monitored in step (a) has reached a second chosen value.

28. The process of claim 23, wherein the fracturing gas is nitrogen.

29. The process of claim 23, wherein the first chosen value is at least as high as 30 vol %.

30. The process of claim 23, wherein the target value is less than about 15 vol %.

31. The process of claim 23, wherein:
(A) the first membrane bank comprises multiple first tubes arranged in parallel such that gas entering that bank may be split into multiple first sub-streams, each first sub-stream directed to one of the first tubes;
(B) at least one of the first tubes has a first tube inlet line in which is positioned a first inlet control valve;
(C) the third membrane bank comprises multiple third tubes arranged in parallel such that gas entering that bank may be split into multiple third sub-streams, each third sub-stream directed to one of the third tubes;
(D) at least one of the third tubes has a third tube inlet line in which is positioned a third inlet control valve;
(E) the process further comprises closing the first inlet control valve when the changing concentration drops below a first determined value; and closing the third inlet control valve when the changing concentration drops below a second determined value.

32. The process of claim 31, wherein the fracturing gas is nitrogen.

33. The process of claim 31, wherein steps (a), (n), (o), (p) and (E) are performed by means of an automated process control system.

34. Apparatus for treating a natural gas stream produced by a well that has been recently stimulated using a fracturing gas, and that contains a changing concentration of fracturing gas, comprising:
(a) a raw gas inlet line, in which are positioned a feed control valve, a flow monitor and a concentration monitor;
(b) a first compressor having a first suction side and a first exhaust side and connected on the first suction side to the raw gas inlet line so that gas may flow through the feed control valve into the first compressor;
(c) a first compressor exhaust line, connected to the first exhaust side and to a first bank of membrane modules having a first feed side and a first permeate side, so that gas may flow from the first exhaust side to the first feed side;
(d) a first residue line joining a first residue outlet of the first bank of membrane modules to a second bank of membrane modules, having a second feed side and a second permeate side, on the second feed side;

(e) a first recycle line connecting the second permeate side to the first suction side, so that gas may be recirculated to the first compressor;

(f) a first flow control valve positioned in the first recycle line and connected through an automated process control system to the concentration monitor;

(g) a residue discharge line from the second bank of membrane modules to enable gas to be collected from the second feed side and discharged from the apparatus;

(h) a back-pressure regulating valve positioned in the residue discharge line and connected through an automated process control system to the flow monitor;

(i) a first permeate line connecting the first permeate side to a second compressor, having a second suction side and a second exhaust side, on the second suction side, so that gas may flow from the first permeate side to the second suction side;

(j) a second compressor exhaust line, connected to the second exhaust side and to a third bank of membrane modules having a third feed side and a third permeate side, so that gas may flow from the second exhaust side to the third feed side;

(k) a third residue line joining a third residue outlet of the third bank of membrane modules to a fourth bank of membrane modules, having a fourth feed side and a fourth permeate side, on the fourth feed side;

(l) a second recycle line connecting the fourth permeate side to the second suction side, so that gas may be recirculated to the second compressor;

(m) a second flow control valve positioned in the second recycle line and connected through the automated process control system to the concentration monitor;

(n) a third recycle line connecting a fourth residue outlet of the fourth bank of membrane modules to the first compressor exhaust line, so that gas may be recirculated to the first feed side;

(o) a permeate discharge line from the third permeate side to enable gas to be collected from the third permeate side and discharged from the apparatus.

\* \* \* \* \*